(12) United States Patent
Forster et al.

(10) Patent No.: US 7,880,614 B2
(45) Date of Patent: Feb. 1, 2011

(54) RFID INTERPOSER WITH IMPEDANCE MATCHING

(75) Inventors: Ian J. Forster, Essex (GB); Barry J. Roberts, Essex (GB)

(73) Assignee: Avery Dennison Corporation, Pasadena, CA (US)

(*) Notice: Subject to any disclaimer, the term of this patent is extended or adjusted under 35 U.S.C. 154(b) by 630 days.

(21) Appl. No.: 11/861,371

(22) Filed: Sep. 26, 2007

(65) Prior Publication Data

US 2009/0079568 A1    Mar. 26, 2009

(51) Int. Cl.
*G08B 13/14* (2006.01)
*G06K 19/06* (2006.01)
*H01Q 9/00* (2006.01)

(52) U.S. Cl. ........... 340/572.1; 340/572.7; 235/492; 343/745; 343/748

(58) Field of Classification Search ............ None
See application file for complete search history.

(56) References Cited

U.S. PATENT DOCUMENTS

| | | |
|---|---|---|
| 5,337,063 A | 8/1994 | Takahira |
| 5,822,685 A | 10/1998 | Forster |
| 6,046,668 A | 4/2000 | Forster |
| 6,107,920 A * | 8/2000 | Eberhardt et al. ........ 340/572.7 |
| 6,206,292 B1 | 3/2001 | Robertz et al. |
| 6,262,692 B1 | 7/2001 | Babb |
| 6,281,797 B1 | 8/2001 | Forster et al. |
| 6,369,772 B1 | 4/2002 | Forster |
| 6,407,669 B1 * | 6/2002 | Brown et al. ............ 340/572.1 |
| 6,456,225 B1 | 9/2002 | Forster |
| 6,480,062 B1 | 11/2002 | Forster |
| 6,483,473 B1 | 11/2002 | King et al. |
| 6,501,435 B1 | 12/2002 | King et al. |
| 6,535,175 B2 | 3/2003 | Brady et al. |
| 6,580,357 B1 | 6/2003 | Forster et al. |
| 6,628,237 B1 | 9/2003 | Forster et al. |
| 6,630,910 B2 | 10/2003 | Forster et al. |

(Continued)

FOREIGN PATENT DOCUMENTS

JP    2001-23060    1/2001

(Continued)

OTHER PUBLICATIONS

Japanese Office Action issued on Apr. 21, 2009 in corresponding Japanese Patent Application 2006-353896.
International Search Report and Written Opinion from corresponding International Application No. PCT/US08/74152.

*Primary Examiner*—Julie Lieu

(57) ABSTRACT

An RFID interposer has conductive material that includes an impedance matching structure. The impedance matching structure aids in matching impedance between a chip that is to be mounted to the interposer, and an antenna that the interposer is to be coupled to. The impedance matching structures may allow different chips, with slightly different electrical characteristics, to be impedance matched to the same antenna configuration, using the same type of interposer. The impedance matching structure may have any of a variety of configurations in the electrically conductive material of the interposer. The structure may be parts of the chip mounting bond pads, may be part of the conductive electrical connection between the chip bond pads and antenna bond pads, may be part of connections between the chip bond pads and the antenna bond pads, and/or may be only indirectly electrically coupled to the antenna bond pads (such as by capacitive coupling).

16 Claims, 7 Drawing Sheets

U.S. PATENT DOCUMENTS

| | | | |
|---|---|---|---|
| 6,642,897 B2 | 11/2003 | Forster et al. |
| 6,646,555 B1 | 11/2003 | Forster et al. |
| 6,720,865 B1 | 4/2004 | Forster et al. |
| 6,734,796 B2 | 5/2004 | Forster et al. |
| 6,744,367 B1 | 6/2004 | Forster |
| 6,778,088 B1 | 8/2004 | Forster |
| 6,799,027 B1 | 9/2004 | Forster |
| 6,806,842 B2 | 10/2004 | King et al. |
| 6,828,941 B2 | 12/2004 | King et al. |
| 6,847,912 B2 | 1/2005 | Forster |
| 6,853,345 B2 | 2/2005 | King et al. |
| 6,853,347 B2 | 2/2005 | Forster et al. |
| 6,894,616 B1 | 5/2005 | Forster |
| 6,895,226 B1 | 5/2005 | Forster et al. |
| 6,895,655 B2 | 5/2005 | Forster et al. |
| 6,903,704 B2 | 6/2005 | Forster et al. |
| 6,914,562 B2 | 7/2005 | Forster |
| 6,975,834 B1 | 12/2005 | Forster |
| 6,985,119 B2 | 1/2006 | Forster et al. |
| 7,046,122 B1 | 5/2006 | Forster |
| 7,046,957 B1 | 5/2006 | Farr et al. |
| 7,055,754 B2 | 6/2006 | Forster |
| 7,057,562 B2 | 6/2006 | Forster et al. |
| 7,059,518 B2 | 6/2006 | Forster |
| 7,088,248 B2 | 8/2006 | Forster |
| 7,091,859 B2 | 8/2006 | Duron et al. |
| 7,093,345 B2 | 8/2006 | Forster et al. |
| 7,098,850 B2 | 8/2006 | King et al. |
| 7,102,520 B2 * | 9/2006 | Liu et al. | 340/572.1 |
| 7,109,867 B2 | 9/2006 | Forster |
| 7,123,204 B2 | 10/2006 | Forster et al. |
| 7,154,283 B1 | 12/2006 | Weakley et al. |
| 7,158,033 B2 | 1/2007 | Forster |
| 7,158,037 B2 | 1/2007 | Forster et al. |
| 7,164,353 B2 | 1/2007 | Puleston et al. |
| 7,170,415 B2 | 1/2007 | Forster |
| 7,180,423 B2 | 2/2007 | Forster et al. |
| 7,190,319 B2 | 3/2007 | Forster et al. |
| 7,191,507 B2 | 3/2007 | Forster et al. |
| 7,193,563 B2 | 3/2007 | King et al. |
| 7,212,127 B2 | 5/2007 | Jacober et al. |
| 7,224,273 B2 | 5/2007 | Forster |
| 7,224,280 B2 | 5/2007 | Ferguson et al. |
| 7,225,992 B2 | 6/2007 | Forster |
| 7,233,250 B2 | 6/2007 | Forster |
| 7,234,642 B2 | 6/2007 | Forster |
| 7,239,287 B2 | 7/2007 | Forster |
| 7,273,173 B2 | 9/2007 | Forster |
| 7,275,040 B2 | 9/2007 | Forster et al. |
| 7,292,148 B2 | 11/2007 | Forster |
| 7,295,117 B2 | 11/2007 | Forster et al. |
| 7,298,266 B2 | 11/2007 | Forster |
| 7,298,267 B2 | 11/2007 | Forster |
| 7,298,330 B2 | 11/2007 | Forster et al. |
| 7,298,343 B2 | 11/2007 | Forster et al. |
| 7,306,162 B2 | 12/2007 | Forster |
| 7,307,527 B2 | 12/2007 | Forster |
| 2005/0035924 A1 * | 2/2005 | Liu et al. | 343/895 |
| 2006/0043198 A1 * | 3/2006 | Forster | 235/492 |
| 2006/0044769 A1 * | 3/2006 | Forster et al. | 361/760 |
| 2006/0054710 A1 * | 3/2006 | Forster et al. | 235/492 |
| 2006/0055617 A1 * | 3/2006 | Hall | 343/850 |
| 2006/0097877 A1 * | 5/2006 | Baba et al. | 340/572.4 |
| 2008/0309567 A1 * | 12/2008 | Sabet et al. | 343/745 |

FOREIGN PATENT DOCUMENTS

| | | |
|---|---|---|
| JP | 2002-534937 | 10/2002 |
| JP | 2005-242438 | 9/2005 |
| WO | 00/41496 | 7/2000 |
| WO | 2004097731 | 11/2004 |
| WO | 2005004044 | 1/2005 |
| WO | 2005073937 | 8/2005 |
| WO | 2006009934 | 1/2006 |
| WO | 2006087423 | 8/2006 |

* cited by examiner

RFID INTERPOSER WITH IMPEDANCE MATCHING

BACKGROUND OF THE INVENTION

1. Field of the Invention

This invention relates to the field of radio frequency identification (RFID) devices, and methods of controlling RFID devices.

2. Description of the Related Art

Radio frequency identification (RFID) tags and labels (collectively referred to herein as "devices") are widely used to associate an object with an identification code. RFID devices generally have a combination of antennas and analog and/or digital electronics, which may include for example communications electronics, data memory, and control logic. For example, RFID tags are used in conjunction with security-locks in cars, for access control to buildings, and for tracking inventory and parcels. Some examples of RFID tags and labels appear in U.S. Pat. Nos. 6,107,920, 6,206,292, and 6,262,692.

As noted above, RFID devices are generally categorized as labels or tags. RFID labels are RFID devices that are adhesively or otherwise have a surface attached directly to objects. RFID tags, in contrast, are secured to objects by other means, for example by use of a plastic fastener, string or other fastening means.

RFID devices include active tags and labels, which include a power source, and passive tags and labels, which do not. In the case of passive tags, in order to retrieve the information from the chip, a "base station" or "reader" sends an excitation signal to the RFID tag or label. The excitation signal energizes the tag or label, and the RFID circuitry transmits the stored information back to the reader. The "reader" receives and decodes the information from the RFID tag. In general, RFID tags can retain and transmit enough information to uniquely identify individuals, packages, inventory and the like. RFID tags and labels also can be characterized as to those to which information is written only once (although the information may be read repeatedly), and those to which information may be written during use. For example, RFID tags may store environmental data (that may be detected by an associated sensor), logistical histories, state data, etc.

It is desirable for there to be a conjugate match between a chip of an RFID device and the antenna of the device. In such a conjugate match situation the chip and the RFID device have equal resistance and opposite reactance. One of the pair is inductive and the other is capacitive, and power transfer between the two is maximized. This conjugate match is usually achieved by selecting antenna configuration to provide an impedance with a desired relationship (such as a match) relative to the impedance of the RFID chip, and/or by selecting the chip to provide a desired impedance.

It will be appreciated that it would be advantageous to have RFID devices with improved performance, features, and versatility.

SUMMARY OF THE INVENTION

According to an aspect of the invention, an RFID interposer includes an impedance matching structure.

According to another aspect of the invention, an RFID interposer includes multiple positions for mounting a chip. The multiple positions may include discrete mounting locations, or a continuous range of mounting locations.]

According to yet another aspect of the invention, a radio frequency identification device (RFID) interposer includes: a dielectric substrate; and electrically conductive material on a major surface of the substrate. The electrically conductive material includes an impedance matching structure.

According to still another aspect of the invention, a method of making an RFID device includes the steps of: coupling an RFID chip to an RFID interposer that has an impedance matching structure; and coupling the RFID interposer to an antenna.

According to a further aspect of the invention, an RFID device includes a package having an antenna on a surface of the package; and an interposer. The interposer includes: a substrate; and an electrically conductive material on a major surface of the substrate, the electrically conductive material including an impedance matching structure. The impedance matching structure is coupled to the antenna.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the annexed drawings, which are not necessarily to scale.

DETAILED DESCRIPTION

A radio frequency identification device (RFID) interposer has conductive material that includes an impedance matching structure. The impedance matching structure aids in matching impedance between a chip that is to be mounted to the interposer, and an antenna that the interposer is to be coupled to. The impedance matching structures may allow different chips, with slightly different electrical characteristics, to be impedance matched to the same antenna configuration, using the same type of interposer. The impedance matching structure may have any of a variety of configurations in the electrically conductive material of the interposer. The structure may be parts of the chip mounting bond pads, may be part of the conductive electrical connection between the chip bond pads and antenna bond pads, may be part of connections between the chip bond pads and the antenna bond pads, and/or may be only indirectly electrically coupled to the antenna bond pads (such as by capacitive coupling). In addition, the impedance matching structure may include provisions for mounting the chips in multiple locations along the interposer conductive material.

Figure 1:
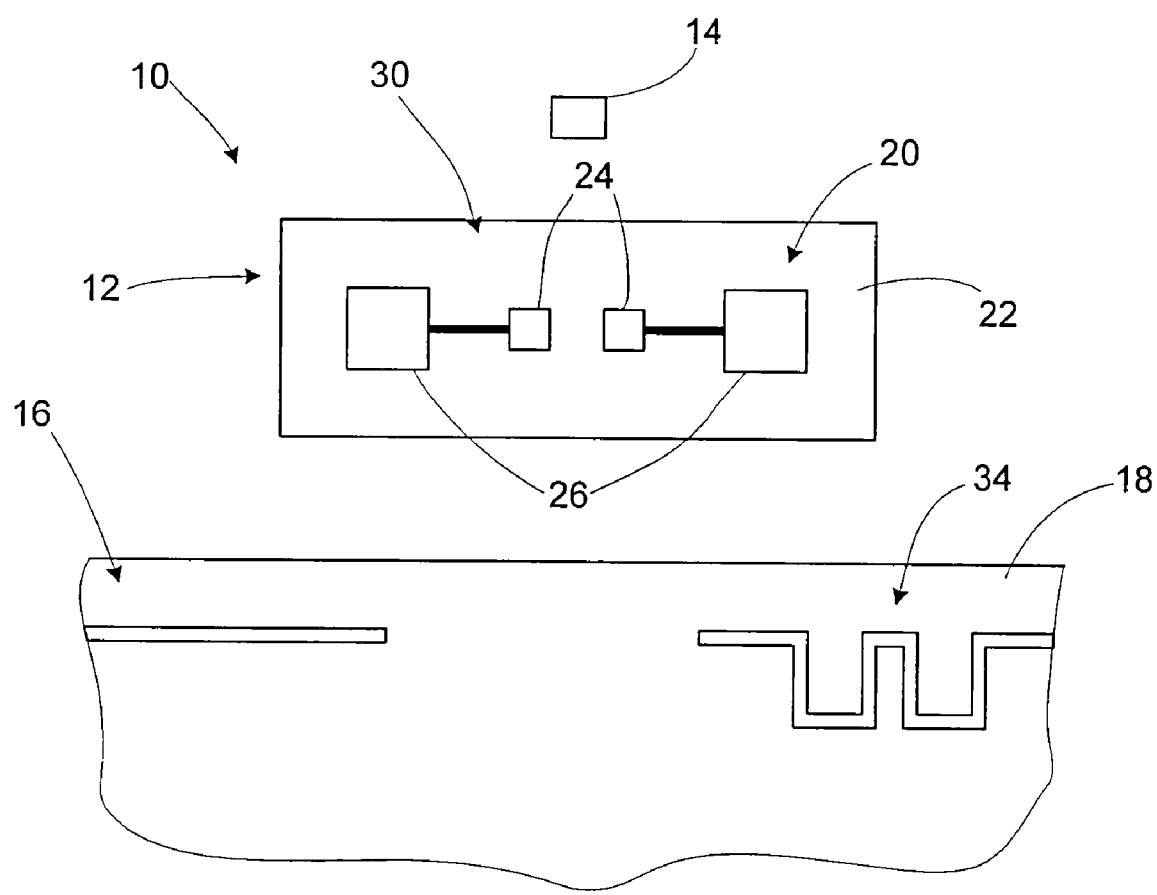
FIG. 1 is an exploded view of an RFID device in accordance with an embodiment of the present invention.

Referring initially to FIG. 1, a radio frequency identification device (RFID) device 10, such as an RFID tag or label, includes an RFID interposer 12 for coupling an RFID chip 14 to an antenna 16 that is on an antenna substrate 18. The interposer 12 has electrically-conductive material 20 that is patterned to make the electrical connection between the chip 14 and the antenna 16. The conductive material 20 is on a major surface of a dielectric substrate 22 of the interposer 12, such as a polymer material or paper substrate. The conductive material 20 has chip mounts or bond pads 24 for making an electrical connection with the chip 14, and antenna bond pads 26 for making an electrical connection with the antenna 16. The conductive material 20 may be any of a variety of suitable electrically conductive material, such as plated or etched metal, or a suitable conductive ink. The electrical connections between the interposer 12, and the chip 14 and the antenna 16, may be a direct, ohmic electrical connection, for instance using a suitable conductive adhesive. Alternatively, the electrical connection may be an indirect electrical connection, such as a capacitive coupling across intervening dielectric material, such as a non-conductive adhesive.

The interposer 12 also includes an impedance matching structure 30. The impedance matching structure 30 is part of the conductive material 20. The impedance matching structure 30 have any of a variety of configurations, some of which are described below. The impedance matching structure 30 may include conductive material that electrically couples the chip bond pads 24 to the antenna bond pads 26. Alternatively or in addition, the impedance matching structure 30 may include features of the chip bond pads 24. As a further alternative, the impedance matching structure 30 may include conductive elements that are indirectly electrically coupled to the antenna bond pads 26. Possible types of structures for the impedance matching structure 30 include shunt inductances, series inductances, areas of capacitance, and specific bond pad configurations. These possible configurations of the impedance matching structure 30 are discussed in greater detail below.

The impedance matching structure 30 provides many advantages to the RFID interposer 12. It may allow different chips, with slightly different impedances or other electrical characteristics, to be effectively utilized with the same antenna layout. To achieve a conjugate match, or some other desired operation point, it is desirable to control the impedance of the combined chip and interposer, relative to the impedance with the antenna. As described earlier, this is usually done by selecting antenna configuration to provide an impedance with a desired relationship (such as a match) relative to the impedance of the RFID chip, and/or by selecting the chip to provide a desired impedance. Of course antenna configurations selected to work with an RFID chip are particular to that chip, and do not work as well (or at all) with chips having different electrical characteristics, such as chips from different manufacturers.

By placing the impedance matching structure 30 on the interposer 12 it may be possible to use a range of chips, having a range of electrical characteristics, while still maintaining the desired conjugate match (or other electrical relationship) with the antenna 16. Put one way, the impedance matching structure 30 compensates for differences in impedances of different chips, for example by reducing or eliminating the differences in combined chip and interposer impedance, relative to differences between different types of chips. This may allow different chips having different electrical characteristics, for example being produced by different manufacturers, to be coupled to the same interposer, for coupling to the same antenna.

Another advantage to use of the impedance matching structure 30 is that it spreads the impedance matching function out between the interposer 12 and the antenna 16. This may advantageously provide a broader bandwidth for the RFID device 10.

Certain types of impedance matching structures 30, such as shunt inductors, also are better able to protect against electrostatic discharge (ESD). This results in a more durable RFID device 10. A further advantage is that the interposer 12 with the impedance matching structure 30 may be easier to test than interposers without impedance matching structures.

The antenna 16 also may include an impedance matching structure 34. Examples of impedance matching structures for antennas are disclosed in U.S. Patent Publication No. US 2006/0054710, which is incorporated herein by reference in its entirety. Various types and combinations of impedance matching structures, such as series inductors, shunt inductors, series capacitors, and/or shunt capacitors, may be used to aid in matching impedance between a chip that is to be mounted to the interposer, and an antenna that the interposer is to be coupled to. A useful tool to assist with impedance matching is a Smith chart, which is well known to one skilled in the art. A Smith chart allows an RF engineer or other qualified person to use combinations of the impedance matching structures or elements to move from one location on the Smith chart, corresponding to a starting complex impedance, to another Smith chart location, corresponding to the desired impedance. In some cases more than one route between the locations on the chart is possible. In such a case a choice may be made in favor of the best option to get the desired result based on the physical limitation we have in forming the inductors and capacitors. For example, very high inductances would be impractical as they would require long thin lines which would be difficult to make and accommodate in the interposer area. The interposers described herein involve transforming the impedance of the mounted chip to another impedance presented to the antenna, which may or may not be a conjugate match. The movement may be quite small, such as for adjusting out the difference between two chips, for example for a small difference in shunt capacitance of a chip. In such a situation a change in the series inductance can compensate over a given bandwidth. Larger changes in impedance may require more impedance matching elements.

Figure 2:
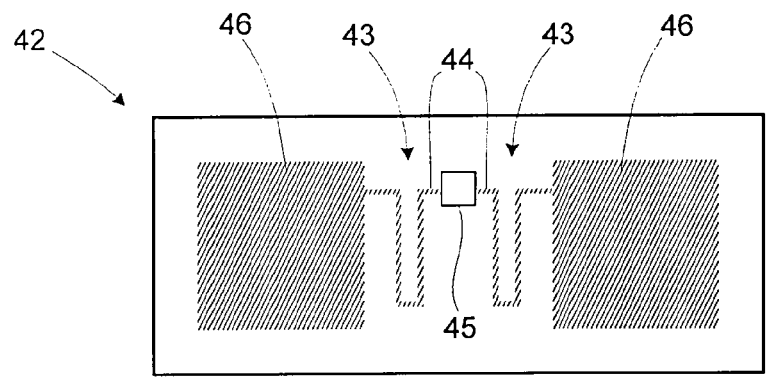
FIG. 2 is a plan view of a first embodiment RFID interposer of the present invention.

The antenna substrate 18 may be any of a variety of objects. For example, the antenna substrate may be a package or a portion of package, with the antenna 16 being on a major surface of the package. The package may be any of a wide variety of packages, such as consumer goods containers, parcels, waybills, postal items, and the like Turning now to FIG. 2, an RFID interposer 42 includes series inductors 43 between chip bond pads 44 used for receiving a chip 45, as well as antenna bond pads 46. The series inductors 43 include a number of turns or other parts (meanders) in close proximity to adjacent of the turns or other parts. This structure has a self-resonance, due to the capacitance between the turns of the inductors 43. The inductors 43 may have the same inductance. The inductors 43 may allow transformation of inductance of different chip designs to substantially the same level, allowing antennas configured for use with one chip design to be usable with different chip designs having different impedances.

Figure 3:
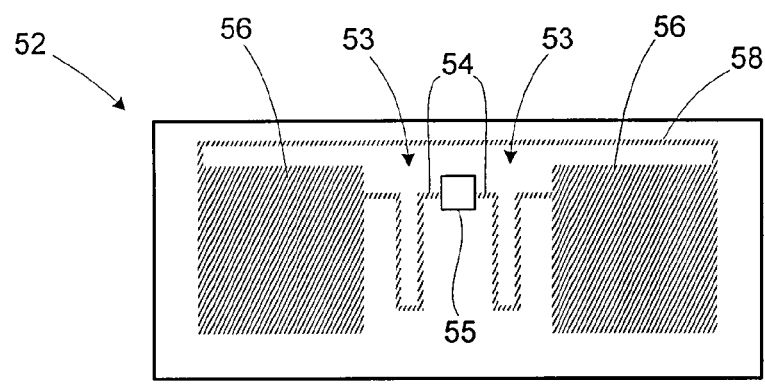
FIG. 3 is a plan view of a second embodiment RFID interposer of the present invention.

FIG. 3 shows an RFID interposer 52 that includes series inductors 53 between chip bond pads 54 used for receiving a chip 55, and antenna bond pads 56. The interposer 52 also includes a shunt inductor 58 that directly electrically couples together the antenna bond pads 56.

Figure 4:
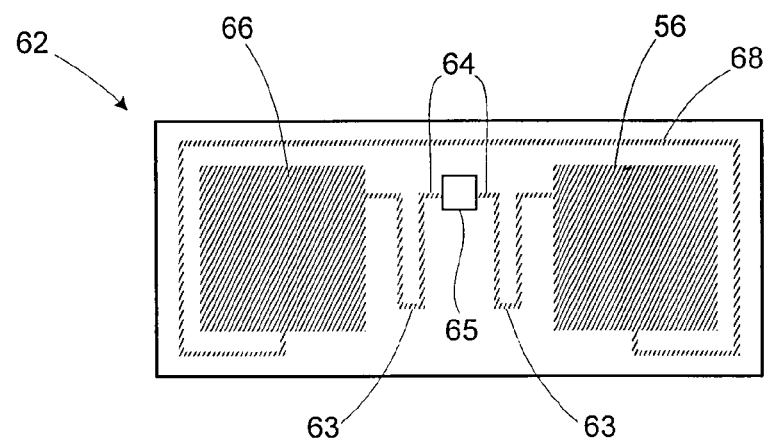
FIG. 4 is a plan view of a third embodiment RFID interposer of the present invention.

FIG. 4 shows an RFID interposer 62 that differs from the interposer 52 (FIG. 3) in that the interposer 62 has a shunt inductor 68 that is longer than the shunt inductor 58. The shunt inductor 68 wraps most of the way around antenna bond pads 66 of the interposer 62. The interposer 62 has series inductors 63 that couple chip bond pads 64 (which receive a chip 65) to the antenna bond pads 66.

Figure 5:
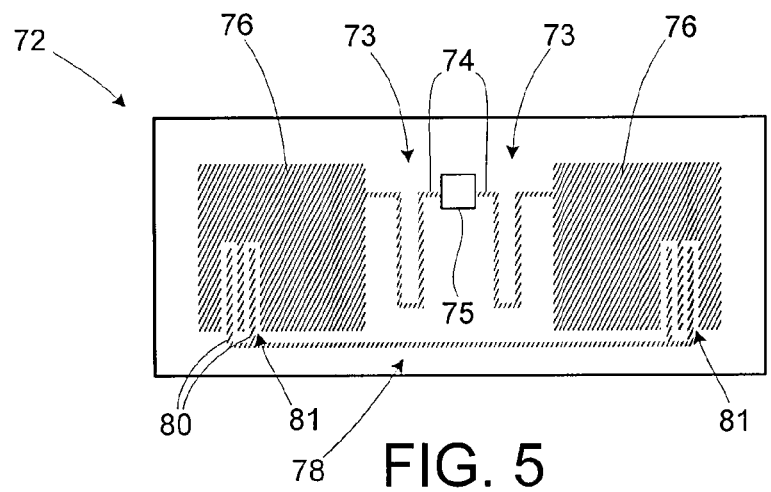
FIG. 5 is a plan view of a fourth embodiment RFID interposer of the present invention.

FIG. 5 shows an RFID interposer 72 that has series inductors 73 that couple chip bond pads 74 to antenna bond pads 76. A chip 75 is coupled to the chip bond pads 74. The interposer 72 also includes a capacitor/inductor shunt 78 that is capacitively coupled to both of the antenna bond pads 76. The shunt 78 places inductance and capacitance in a link between the antenna bond pads 76. The shunt 78 includes multiple end portions 80 that are located in open spaces 81 between portions of the antenna bond pads 76. The interdigitation between shunt end portions 80 and the antenna bond pads 76 form electromagnetic fields that indirectly capacitively electrically couple together the series capacitor/inductor 78 with the antenna bond pads 76.

Figure 6:
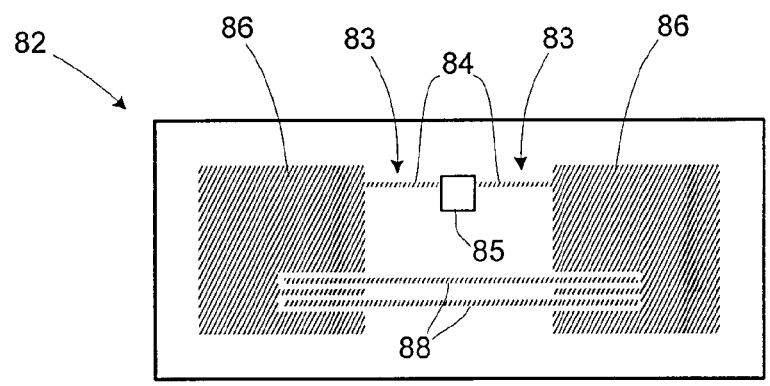
FIG. 6 is a plan view of a fifth embodiment RFID interposer of the present invention.

An alternative capacitive shunt is illustrated in FIG. 6, which shows an RFID interposer 82 that includes a pair of capacitive shunts 88. The shunts 88 are capacitively coupled to both of the antenna bond pads 86 by protruding into open spaces between portions of the antenna bond pads 86. The interposer 82 has small series inductors 83 between chip bond pads 84 (which receive a chip 85) and the antenna bond pads 86.

It will be appreciated that the various impedance matching structures shown in FIGS. 2-6 (the series inductors 43, the series inductors 53, the shunt inductor 58, the shunt inductor 68, the shunt capacitor/inductor 78, and the shunt capacitor/inductor 88) are only examples of impedance matching structures. A wide variety of other configurations of impedance matching structures are possible.

Figure 7:
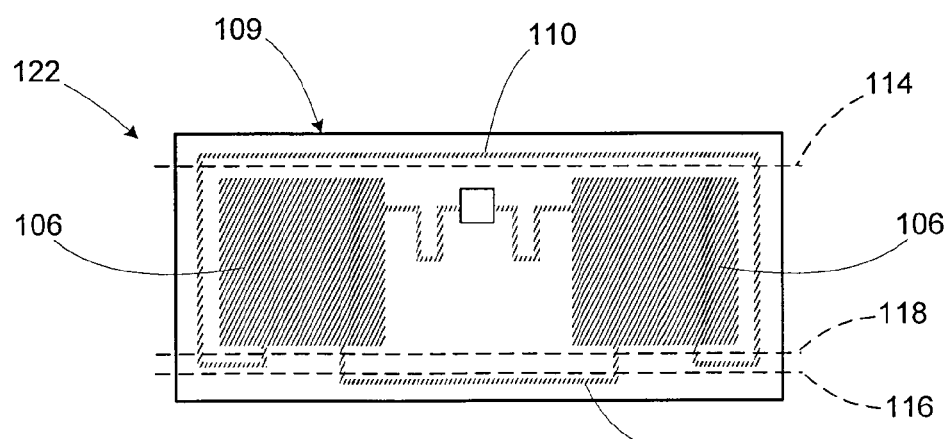
FIG. 7 is a plan view of a sixth embodiment RFID interposer of the present invention.
Figure 8:
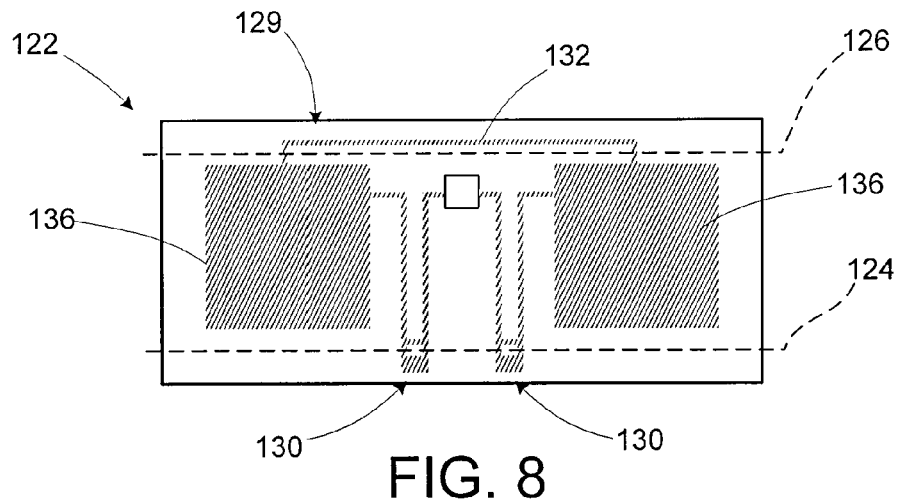
FIG. 8 is a plan view of a seventh embodiment RFID interposer of the present invention.

FIGS. 7 and 8 illustrate tunable RFID interposers, which may have the characteristics of their impedance matching structures changed by removing certain portions of the interposers. FIG. 7 shows an RFID interposer 102 that has a tunable impedance matching structure 109 that includes a pair of conductive shunts 110 and 112 coupling together antenna bond pads 106. The shunts 110 and 112 have different lengths and/or widths, with the shunt 110 longer than the shunt 112. Either or both of the shunts 110 and 112 may be deactivated by physically removing or altering portions of the interposer 102, severing or otherwise altering the connection between the antenna bond pads 106 along either or both of the shunts 110 and 112. For example, one or more portions of the interposer may be removed by cutting, slitting, or otherwise physically separating along separation lines 114, 116, or 118. Cutting or slitting along the line 114 deactivates the shunt 110. Cutting or slitting along the line 116 deactivates the shunt 112. Cutting or slitting along the line 118 deactivates both of the shunts 110 and 112. It will be appreciated that such an arrangement creates four possible configurations for the interposer 102, depending upon which of the shunts 110 and 112 (if any) is deactivated. The interposer 102 may thus have its impedance matching structure tuned to multiple points, each or which provides different electrical characteristics.

FIG. 8 shows another tunable interposer, an RFID interposer 122 that has a tunable impedance matching structure 129 that includes a tunable series impedance 130 and a shunt 132. The interposer 122 can be physically separated along a line separation 124 to reduce the conductive material of the series impedance 130, changing the electrical characteristics of the series impedance 130. Alternatively the interposer 122 can be physically separated along a separation line 126 to sever the connection of the shunt 132 between the antenna bond pads 136. As with the interposer 102 (FIG. 7), the tunable impedance matching structure 129 of interposer 122 is tunable to four different points, with different electrical characteristics.

It will be appreciable that tunable impedance matching structures may have any of a wide variety characteristics. Such tunable impedance matching structures may be tuned by any of a variety of physical alterations.

Figure 9:
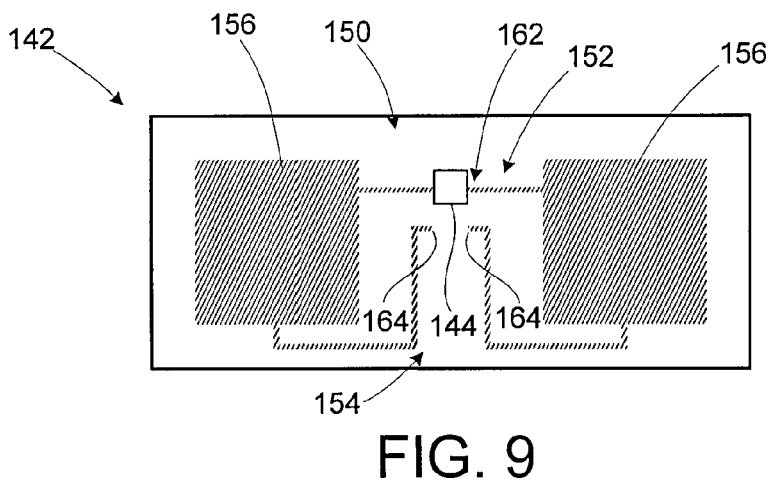
FIG. 9 is a plan view of an eighth embodiment RFID interposer of the present invention, with a chip in a first location on the interposer.
Figure 10:
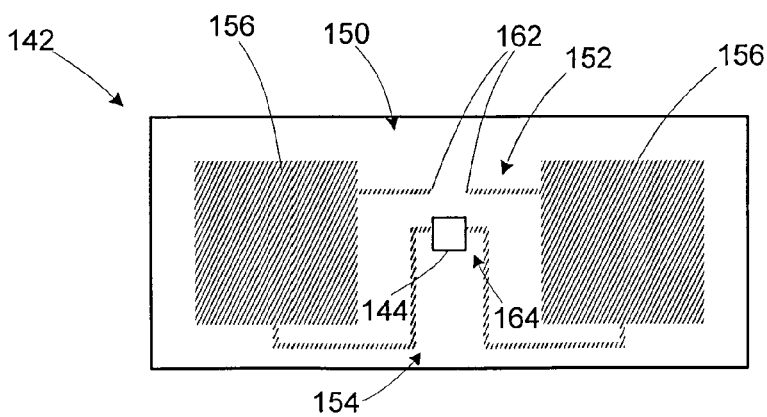
FIG. 10 is a plan view of the eighth embodiment RFID, with a chip in a second location on the interposer.
Figure 11:
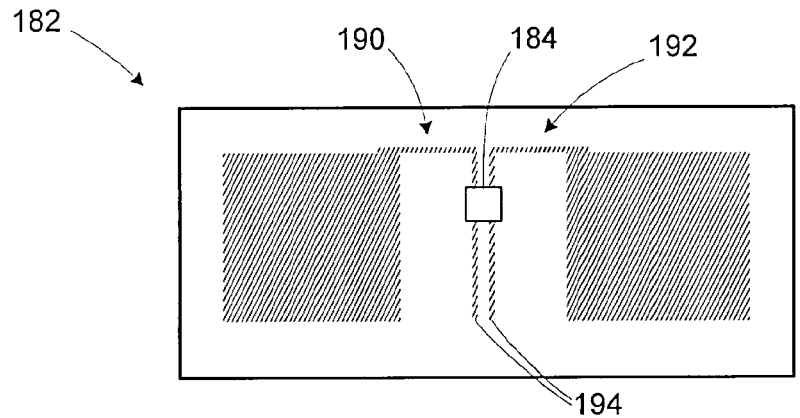
FIG. 11 is a plan view of a nine embodiment RFID interposer of the present invention.

FIGS. 9-11 show various embodiments of RFID interposers which have impedance matching structures that have different electrical characteristics for different placements of RFID chips. FIGS. 9 and 10 show an RFID interposer 142 that has a pair of locations for mounting an RFID chip 144. The interposer 142 includes an impedance matching structure 150 that includes a pair of sets of series inductors 152 and 154, both coupled to antenna bond pads 156. The sets of series inductors 152 and 154 have respective sets of chip bond pads 162 and 164. The inductors 152 and 154 have different inductances. Coupling the chip 144 to one or other of the chip bond pads 162 and 164, illustrated in FIGS. 9 and 10 respectively, thus produces different electrical characteristics in the impedance matching structure 150.

FIG. 11 illustrates an interposer 182 with an impedance matching structure 190 that allows continuously variable positioning of an RFID chip 184. The impedance matching structure 190 includes series inductors 192 that in turn include parallel conductive lines 194 that allow variable placement of the chip 184. The chip 184 may be placed at a number of variable positions along the conductive lines 194. The various positions for the chip 184 provide different electrical characteristics, in particular different impedance, for the impedance matching structure 190. The positions for mounting different chips 184 with different impedances may be selected so as to achieve substantially the same overall impedance for the combination of the chip 184 and the interposer 182 with different chips.

It will be appreciated that the interposers 142 and 182 shown in FIGS. 9-11 are only two examples of interposers which have impedance matching structures that are able to couple to RFID chips at different locations, to thereby obtain different electrical characteristics. Many other configurations are possible that allow mounting of chips at distinct or continually variable different positions to achieve different electrical characteristics.

Interposer impedance matching may also be accomplished by varying the parasitic coupling between chip bond pads and metal in the chip. The chip bond pads may be configured to take advantage of this parasitic coupling to achieve several desirable outcomes. For example, the chip bond pads may be configured to provide substantially constant impedance matching even when the chip placement varies, such as by varying within a tolerance in placement position by a placing machine, such as a pick-and-place device.

Figure 12:
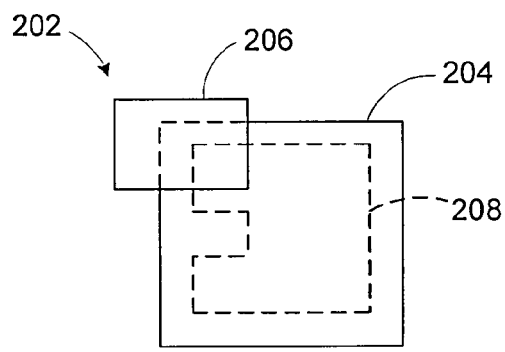
FIG. 12 is a bottom schematic view of a chip bond pad of a tenth embodiment RFID interposer of the present invention, in engagement with a first chip.
Figure 13:
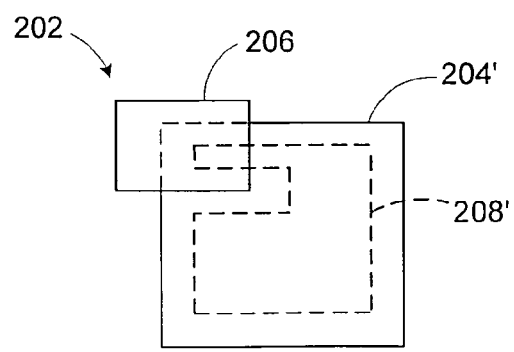
FIG. 13 is a bottom schematic view of the chip bond pad of the tenth embodiment RFID interposer, in engagement with a second chip.

Another advantage is illustrated in FIGS. 12 and 13, where an RFID interposer 202 has chip bond pads 206 configured to couple to chips 204 and 204'. The chips 204 and 204' have slightly different impedances, and may be from different manufacturers. The chips 204 and 204' also have different respective internal metal structure layouts or configurations 208 and 208'. The chip bond pads 206 may be configured so that they take advantages of the different chip metal structures 208 and 208' to provide different parasitic coupling between the chip bond pads 206 and the different chip metal structures 208 and 208', to compensate for the different impedances of the chips 204 and 204'.

Figure 14:
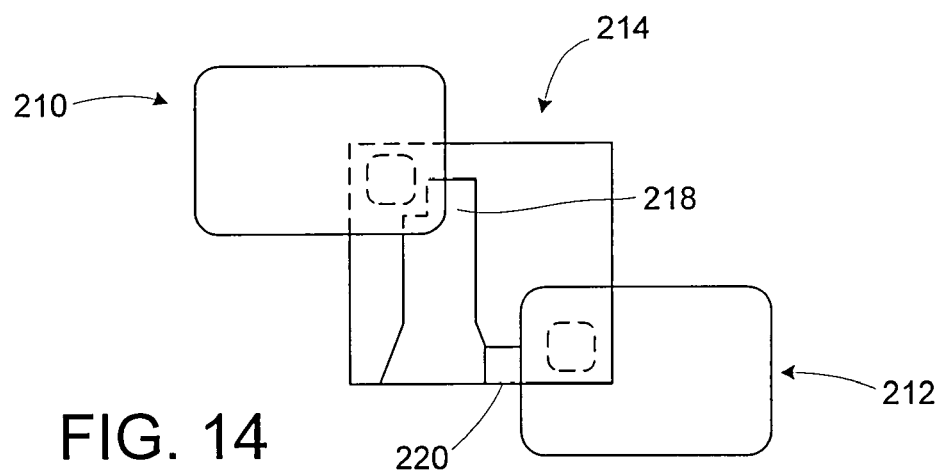
FIG. 14 is a bottom view showing connection of a bond pad configuration of an eleventh embodiment RFID interposer, to a first chip.
Figure 15:
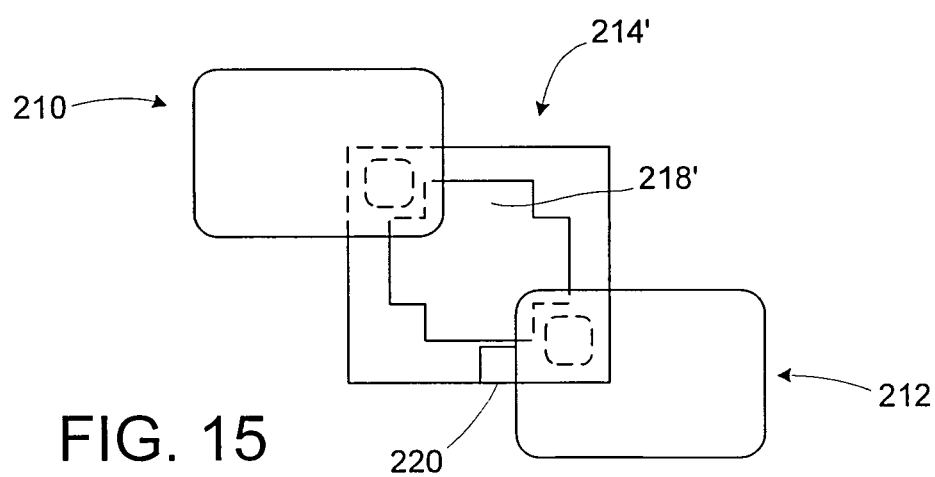
FIG. 15 is a bottom view showing connection of the bond pad configuration of FIG. 14, to a second chip.

FIGS. 14 and 15 illustrate another configuration, with bond pads 210 and 212 configured to couple to chips 214 and 214' with different internal metal structure layouts or configurations 218 and 218'. The bond pad 210 has a generally rectangular shape that overlaps the layouts 218 and 218' by about the same amount. The bond pad 212 has a tab 220 to enable it also overlap the layouts 218 and 218' by about the same amount. The tab 220 overlaps the metal layout 218' but not the layout 218, making up for the failure of the rest of the bond pad 210 to overlap other parts of the layout 218'.

Figure 16:
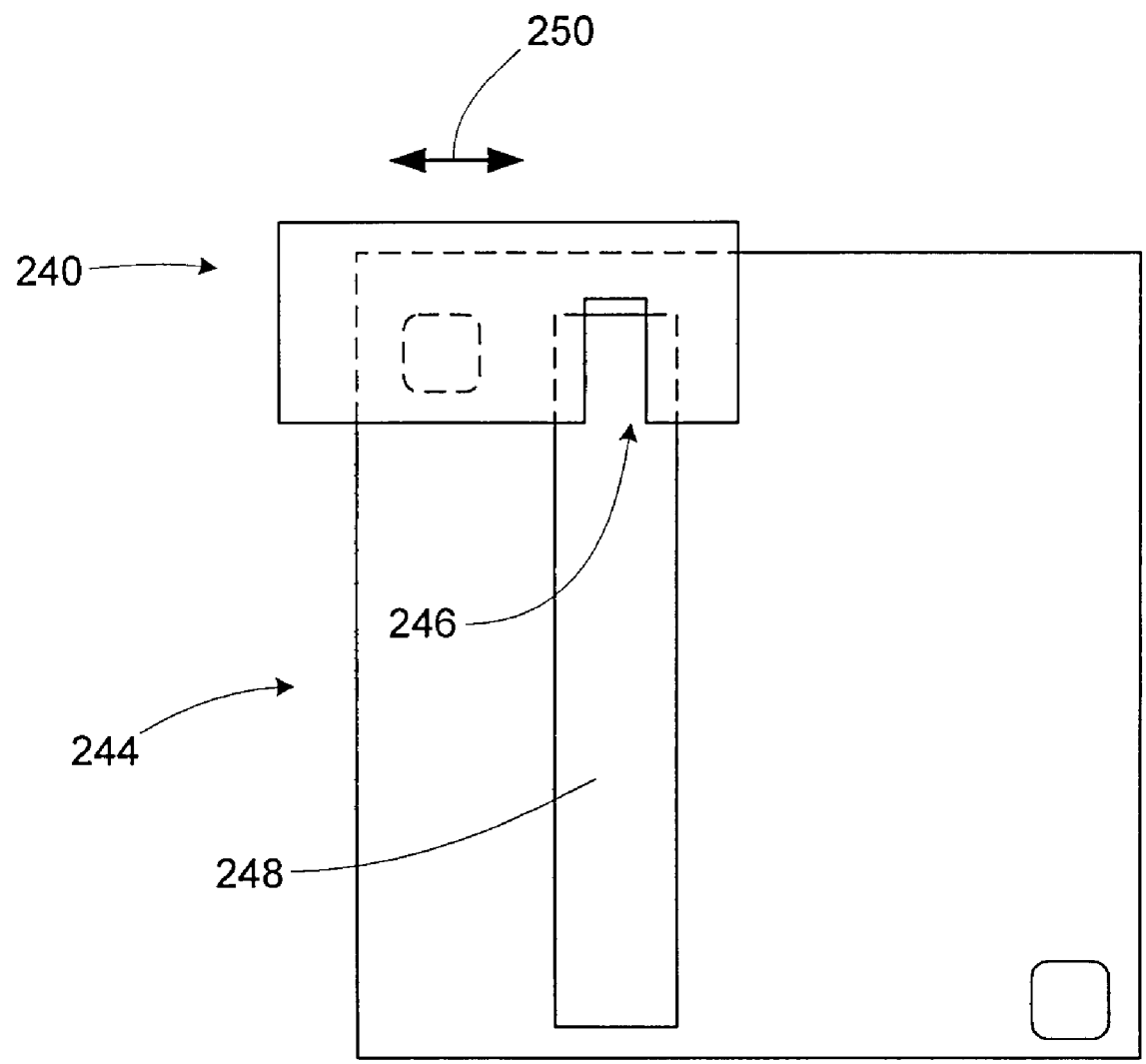
FIG. 16 is a bottom view showing a bond pad configuration of a twelfth embodiment RFID interposer.

FIG. 16 shows a bond pad 240 that has a configuration to enable it to compensate to some extent for misalignment of the bond pad relative to a chip 244. The bond pad 240 has a notch 246 that is located so as to overlie a portion of the metal structure layout 248 of the chip 244. Some misalignment of the bond pad 240 in a direction 250 perpendicular to the notch 246 will still results in substantially the same amount of the bond pad 240 overlying the metal structure layout 248.

A further use of parasitic capacitance when chips are produced as mirror images of one another, as is sometimes done to facilitate chip manufacturing. The different mirror-image chips may have slight different impedances, and chip bond pads may be configured as discussed above to use different parasitic coupling to the mirror-image layouts of the chips, in order to compensate for the different impedances.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A radio frequency identification device (RFID) interposer comprising:
    a dielectric substrate;
    electrically conductive material on a major surface of the substrate;
    wherein the electrically conductive material includes an impedance matching structure;
    chip bond pads for receiving and electrically coupling one or more chips to the electrically conductive material and antenna bond pads for electrically coupling the electrically conductive material to an antenna;
    and wherein the impedance matching structure includes a shunt electrically coupling the antenna bond pads together.

2. The RFID interposer of claim 1, wherein the impedance matching structure includes one or more series inductors electrically coupling the chip bond pads to the antenna bond pads.

3. The RFID interposer of claim 1, wherein the shunt provides a conductive pathway between the antenna bond pads.

4. The RFID interposer of claim 1, wherein the shunt includes a capacitor/inductor that is indirectly capacitively electrically coupled to at least one of the antenna pads, without a direct electrical connection.

5. The RFID interposer of claim 1, wherein the impedance matching structures includes the chip bond pads having a configuration to electrically interact differently with internal mechanical structures of different chips to be coupled to the chip bond pads.

6. The RFID interposer of claim 1,
    wherein the chip bond pads allow coupling of the chip in more than one location; and
    wherein the impedance matching structure has electrical characteristics that change depending upon where the chip is coupled to the chip bond pads.

7. The RFID interposer of claim 6, wherein the chip bond pads allow coupling of the chip in multiple discrete locations.

8. The RFID interposer of claim 6, wherein the chip bond pads allow coupling allow a continuous range of chip mounting locations of the chip.

9. The RFID interposer of claim 1, wherein the impedance matching structure is a tunable impedance matching structure with tunable electrical characteristics.

10. The RFID interposer of claim 9, wherein the tunable impedance matching structure is configured to be tuned by physically altering one or more portions of the interposer.

11. The RFID interposer of claim 1, in combination with a chip and an antenna, each coupled to the interposer to form an RFID device.

12. The combination of claim 11, wherein the antenna includes an antenna impedance matching structure.

13. A method of making an RFID device, the method comprising:
    patterning an electrically conductive material having an impedance matching structure with an inductor shunt;
    coupling an RFID chip having chip bond pads for receiving and electrically coupling the RFID chip to an RFID interposer with the impedance matching structure, and coupling the RFID interposer to an antenna.

14. The method of claim 13, wherein the coupling the chip to the interposer includes having the impedance matching structure compensate for electrical characteristic differences between different types of chips and electrical characteristic differences of the interposer and the different types of chips.

15. A radio frequency identification (RFID) device comprising:
- a first substrate having a first face and a second face;
- an antenna on one of the faces;
- a second substrate attached to the first substrate;
- chip bond pads for receiving and electrically coupling one or more chips to the second substrate;
- an impedance matching structure on the second substrate;
- wherein the impedance matching structure is electrically coupled to the antenna and has electrical characteristics that change depending upon where the chip is coupled to the chip bond pads.

16. An RFID device comprising:
- a package having an antenna on a surface of the package; and
- an interposer that includes:
  - a substrate;
  - an electrically conductive material on a major surface of the substrate, the electrically conductive material including an impedance matching structure that includes a shunt;
- chip bond pads for receiving and electrically coupling one or more chips to the substrate;
- antenna bond pads for electrically coupling the electrically conductive material to an antenna; and
- wherein the impedance matching structure is coupled to the antenna.

* * * * *